Jan. 17, 1939.     L. HORST     2,144,457
PROCESS OF PRODUCING COLOR FILMS BY THE SUBTRACTIVE THREE-COLOR METHOD
Filed April 4, 1938
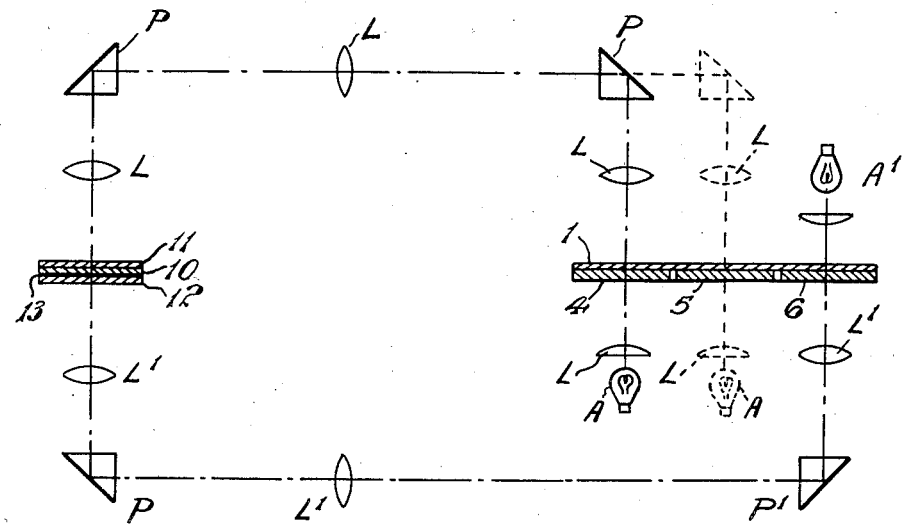
Fig. 2.
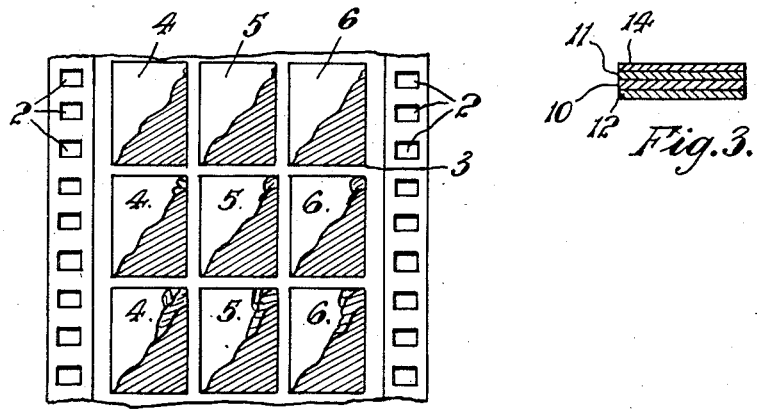
Fig. 1.
Fig. 3.
Inventor:
Ludwig Horst
By: Richardson and Ques
Attys.

Patented Jan. 17, 1939

2,144,457

UNITED STATES PATENT OFFICE 2,144,457

PROCESS OF PRODUCING COLOR FILMS BY THE SUBTRACTIVE THREE-COLOR METHOD

Ludwig Horst, Berlin-Halensee, Germany

Application April 4, 1938, Serial No. 199,893
In Great Britain September 16, 1936

3 Claims. (Cl. 95—2)

This invention relates to a process of producing color films by the subtractive three-color method.

The invention broadly comprises taking simultaneously three color-separation negatives, in juxtaposition on a color-sensitized film of any suitable width, and printing said three color-separation negatives in superposition and in register on to one positive film in such a manner that two color-separation negatives are first printed simultaneously on opposite sides of said positive film, whereupon said positive film is mordanted and dyed blue and red in known manner and thereafter coated with bichromated colloid and a third separation negative is printed on the bichromate-coated portion of the positive film to register with the other two images.

The coating of a positive film with bichromated colloid and printing of a further positive image on said coating of bichromated colloid is known and I make no claim thereto per se.

The negative film employed in carrying out the invention is preferably a film sensitive to only blue light rays having marginal portions extending to one-third of the width of the film on each side, additionally sensitized, one to red and the other to green light rays.

The picture is taken as in all three-color processes, with the aid of a suitable three-color camera on to a negative picture band of preferably greater width than the standard size and having additionally sensitized marginal portions as hereinafter described. A negative picture band of a width of 60 mms. is particularly suitable in carrying out the invention, since it enables camera lenses of short focal length to be employed and moreover allows a feed stroke of three perforations with negative pictures of slightly reduced size, which reduction is however, again compensated by enlarging to normal size in the copying process.

The elimination of color filters during the taking avoids light losses, and renders it possible to make exposures at speeds which enable simultaneous sound recording.

In one method of carrying out the invention, strips of about 60 mms. in width are cut out of an ordinary roll film web. The negative emulsion must preferably be only sensitive to blue light rays. The perforations extend on the left and right of this 60 mms. strip. The marginal third portions of the negative film strip thus produced are additionally sensitized in a sensitizing machine one for red and one for green, by bathing them in suitable sensitizers, so that a film band is obtained which has marginal thirds destined for the red and green separation negatives, whereas the middle third destined for the blue separation negative is not additionally sensitized.

In order that the invention may be more readily understood, the same will hereinafter be further explained with reference to the accompanying drawing, in which:—

Fig. 1 is a view of the negative film band with the color-separation negatives situated side by side;

Fig. 2 is a diagrammatic representation of a known form of optical copying machine suitable for printing from the negative; and Fig. 3 is a section on an exaggerated scale through a finished positive film band, produced in accordance with the invention.

As will be seen from Fig. 1, the negative film band 1 is provided with the usual perforations 2, so distributed that three of such perforations correspond to the length of one frame 3. Said frame 3 consists of three identical negative images 4, 5, 6, situated side by side, the image 4 being the minus-blue, the image 5 the minus-yellow and the image 6 the minus-red component.

After the negative strip has been developed, fixed and dried, it is introduced into an optical copying machine of the kind shown in Fig. 2 of the drawing. Said copying machine comprises two sources of light, A, A¹, which illuminate the marginal portions 4 and 6 respectively of the film band 1, and, through a system of prisms P and lenses L and prisms P¹ and lenses L¹, respectively, throw the color-separation images on to opposite sides of a positive film band 10, coated on one side with an emulsion layer 11 and on the opposite side with an emulsion layer 12, an anti-halation layer 13 being interposed between the band 10 and one of the emulsion layers.

After exposure, the positive film is treated in known manner by mordanting and dyeing to convert it into a red-blue two-color film, whereby at the same time the anti-halation layer is destroyed.

The two-color film thus produced lacks the third component color, namely yellow. This is obtained by now applying on one side of the positive film band a coating of bichromated colloid, e. g. gelatine, with a yellow dye, whereupon the film band is again run through the copying machine whilst only the middle minus-yellow negative 5 of the negative film band 1 is projected on to the positive film band by shifting the source of light A and its lens and prism system to the position shown in dotted lines. When the yellow image has been developed in known manner and dried, the three-color film is ready for use.

In view of the fact that the positive film band has to be coated with bichromated gelatine, it is necessary to employ for the previous dyeing operations dyestuffs which are not altered by bichromate. Thus for example fuchsine base may be employed as the dyestuff for the red component, methylene blue or a mixture of methylene blue and methylene green for the blue component, and auromine for the yellow component.

I claim:—

1. In a process of producing color films by the subtractive three-color method, the steps which comprise simultaneously taking three color-separation negatives side by side on a color sensitized film, printing two of said color-separation negatives in register on to opposite sides of a positive film coated on both sides with a sensitized emulsion layer, mordanting and dyeing said positive film in known manner so as to produce two positive images, thereafter coating said positive film with bichromated colloid in which is incorporated a dyestuff, and printing the third color-separation negative on to the bichromated portion of said positive film to register with the other two images.

2. In the process of producing color films by the subtractive three-color method, the steps which comprise sensitizing a negative film to blue light rays, additionally sensitizing approximately one-third of the film on each side to red and green light rays, respectively, exposing said film to form sets of color separation negatives, each set comprising three negatives located side by side across the film, simultaneously printing the marginal negatives onto opposite sides of a positive film coated on both sides with a sensitized emulsion layer, mordanting and dyeing said positive film to produce positive images, superimposing on one side of said positive film a layer of bichromated colloid containing a dyestuff, and printing the middle negatives onto said layer in registry with the positive images produced from the corresponding marginal negatives.

3. In the process of producing color films by the subtractive three-color method, the steps which comprise taking simultaneously three color-separation negatives side by side on a film which is sensitized to different colors, preparing a positive film having a sensitized emulsion layer on both sides with an anti-halation layer interposed between the film and one of said sensitized layers, simultaneously printing the marginal color-separation negatives in registry onto opposite sides of said prepared positive film, mordanting and dyeing said positive film to produce two positive images, destroying said anti-halation layer, coating said positive film with bichromated colloid containing a dyestuff, and printing the middle color-separation negative onto the bichromated side of the film in registry with said images.

LUDWIG HORST.